United States Patent [19]
Zienty

[11] 3,779,869
[45] Dec. 18, 1973

[54] ENZYME STABILIZATION
[75] Inventor: Mitchell Frank Zienty, Elkhart, Ind.
[73] Assignee: Miles Laboratories, Inc., Elkhart, Ind.
[22] Filed: May 13, 1971
[21] Appl. No.: 143,194

[52] U.S. Cl. .................................. 195/68, 195/56
[51] Int. Cl. ............................................. C12d 13/10
[58] Field of Search .................. 195/65, 66, 63, 68, 195/56

[56] References Cited
UNITED STATES PATENTS
3,625,828   12/1971   Brownewell ..................... 195/66 R
3,694,314   9/1972   Lloyd et al. ....................... 195/31 F OTHER PUBLICATIONS
Ellar et al., Chemical Abstracts, Vol. 74, 71784X, 1971.

Ellar et al., Biochimica et Biophysica Acta, Vol. 225, pgs. 140–150, (1971).

Primary Examiner—Lionel M. Shapiro
Attorney—Joseph C. Schwalbach, Louis E. Davidson, Harry T. Stephenson and George R. Caruso

[57] ABSTRACT

The glucose isomerase activity contained within bacterial cells can be stabilized by treating the bacterial cells with glutaraldehyde. The resulting stabilized enzyme can be used for conversion of glucose to fructose and then reused for further conversions with minimum reduction in enzyme activity after each use.

3 Claims, No Drawings

ENZYME STABILIZATION

BACKGROUND AND PRIOR ART

It is known that a glucose isomerase enzyme can be employed to catalyze the conversion of glucose (dextrose) to fructose (levulose) which has higher sweetening power than the starting material. Glucose isomerase is also known to be produced by fermentation of organisms, such as Pseudomonas hydrophila, Streptomyces flavovireus, Streptomyces echinatur, Streptomyces achromogenus, Streptomyces albus, Streptomyces olivaceus and the like, in appropriate nutrient media. The glucose isomerase is formed inside the bacterial cells which grow during its production. The cells can be filtered off from the fermentation beer and used directly as a source of glucose isomerase. Alternatively, the cells can be recovered by filtration and then ruptured by well-known means. The resulting ruptured cells and released contents can be used as a source of glucose isomerase. Still further, the cells can be ruptured and the debris removed by centrifugation. The supernatant liquid can be used directly as a source of glucose isomerase or the enzyme can be recovered as a powder from this liquid by well-known techniques.

The glucose isomerase produced by all these prior art techniques did not become commercially useful because of the high cost of use of the enzyme. The enzyme production costs were high because of the expensive nutrient media necessary and the relatively low yields of enzyme as compared to production techniques for other enzymes. It is therefore necessary that the glucose isomerase be capable of being recovered after use and then reused for further conversions of glucose to fructose.

The glucose isomerase is most suitable for recovery and reuse if it is still contained within the original bacterial cells. The bacterial cells can be easily separated from the sugar-containing reaction conversion medium. However, the prior art techniques still prohibited significant reuse of the bacterial cells since the cells lost about 50 percent of their glucose isomerase activity during each use.

SUMMARY OF THE INVENTION

In accordance with the present invention, a process is provided for stabilization of glucose isomerase in bacterial cells which comprises treating bacterial cells containing glucose isomerase activity with glutaraldehyde.

DESCRIPTION OF THE INVENTION

The bacterial cells containing glucose isomerase activity useful in the process of the present invention can be produced by well-known procedures. The preferred enzyme-containing cells are produced by growing under submerged aerobic conditions a culture of Streptomyces olivaceus NRRL 3583 or mutants thereof in a medium containing appropriate nutrients. The resulting bacterial cells are separated from the fermentation beer by filtration or centrifugation.

The recovered bacterial cells are then suspended in an aqueous medium and are mixed with glutaraldehyde. The glutaraldehyde is employed in an amount from about 0.1 to about 50 weight percent based on the dry weight of the cells. Preferably, the glutaraldehyde is employed in an amount from about 10 to about 50 weight percent based on the dry weight of the cells. The bacterial cells initially have a pH of about 8.5. As the bacterial cells are treated with the glutaraldehyde, the pH drops eventually to about 6.5. If the initial pH is above about 8.5 or if the pH during treatment drops to below about 6.5, suitable buffering materials should be added to maintain the pH of the bacterial cells within the range from about 6.5 to about 8.5.

The bacterial cells should be treated with the glutaraldehyde for from about one-half to about 2 hours. The preferred treatment time is from about 1 to about 1½ hours.

The treatment temperature is not narrowly critical and can conveniently be from about 15°C. to about 60°C.

The glucose isomerase activity of the starting material bacterial cells and the glutaraldehyde-treated material was assayed by the following procedure.

GLUCOSE ISOMERASE ASSAY

A 62.5 percent (weight/volume basis) aqueous solution of glucose was prepared by slowly adding with stirring 625 grams of anhydrous glucose to 300 ml. of hot distilled water. The solution was cooled to room temperature and 125 ml. of 1 molar concentration aqueous solution of tris (hydroxymethyl) aminoethane at pH 8.5, 125 ml. of 1 molar concentration aqueous magnesium sulfate solution and 50 ml. of 0.025 molar concentration aqueous cobaltous chloride solution were added. The resulting mixture was then diluted to 1 liter with distilled water.

A 10 ml. portion of the above glucose solution was added to a 25 ml. volumetric flask. Sufficient enzyme to be assayed was added to produce a reduction of specific rotation, as hereinafter defined, of about 2.9° to about 7.5°. The flask contents were then diluted to 25 ml. with distilled water, and the resulting mixture was incubated at 60°C. for 2 hours. The reaction was then stopped by adding 1 ml. of a 0.5 molar concentration aqueous solution of perchloric acid. The mixture was then centrifuged at 15,000 R.P.M. for 20 minutes, and the optical rotation (in degrees) of the supernatant liquid was measured by well-known techniques. A blank was run by the same procedure but without the presence of the enzyme. The optical rotation of the blank was also measured. The specific rotation, $[\alpha]_D^{25}$, of the sample or blank was $2\alpha$ or two times the observed optical rotation. The percent conversion of glucose to fructose was calculated by the following formula:

Percent glucose conversion = $[\alpha]_{blank} - [\alpha]_{sample}$ /$[\alpha]_{blank}$ + 92 × 100

The enzyme activity in glucose isomerase units (GIU) of the enzyme sample being assayed was calculated by the following formula:

GIU/gram or GIU/liter = micrograms fructose formed × 0.0463 /mg. or ml. enzyme used wherein the micrograms fructose formed were calculated by multiplying the above-calculated Percent Glucose Conversion value by $6.25 \times 10^6$. A glucose isomerase unit is the amount of enzyme which will convert one micromole of glucose to fructose per minute under the conditions of the assay.

The invention will be described in further detail in the following examples.

EXAMPLE 1

A culture of *Streptomyces olivaceus* NRRL 3583 was transferred to an agitated aerated fermentor containing 10 liters of an aqueous mixture containing 0.7 percent xylose, 0.3 percent refined corn starch, 1.0 percent peptone, 0.50 percent meat extract, 0.25 percent yeast extract, 0.50 percent sodium chloride and 0.05 percent magnesium sulfate and having a pH of 7.0. All the above percent values were on a weight/volume basis. The agitator was rotated at 400 R.P.M. and air was passed through the medium at a rate of 3 volumes of air per volume of medium per minute. The fermentation was continued for 24 hours at 32°C. The fermentation beer was then centrifuged at 40,000 R.P.M. to separate the bacterial cells. A portion of the bacterial cells was then frozen and lyophilized.

Three grams of the freeze-dried whole cells were suspended in 50 ml. of aqueous tris (hydroxymethyl) aminomethane at pH 8.5, and the stirred suspension was treated with 0.1 gm. of a 25 weight percent aqueous glutaraldehyde solution (0.83 weight percent glutaraldehyde based on dry weight of the cells) with stirring at room temperature (about 20°C.) for 1.5 hours. The treated cells having an activity of 145 GIU/gram were collected by filtration and added to a 62.5 weight percent aqueous solution of glucose containing 0.001 weight percent cobalt chloride and 0.01 weight percent magnesium chloride. The resulting mixture was reacted at 70°C. for 2 hours to convert about 4.5 percent of the glucose to fructose. The cells were separated from the reaction mixture by centrifugation and the fructose-dextrose mixture was decanted. The cells were assayed to have the same glucose isomerase activity as before their use. The cells were then used again to treat a fresh glucose solution under the same conditions as described above and were recovered and assayed. This procedure was repeated for a total of twelve uses of the cells. These cells still contained 56 percent of the initial glucose isomerase activity. Cells which had not been treated with glutaraldehyde lost substantially all their glucose isomerase activity upon being used twice.

EXAMPLE 2

A fermentation beer containing *Streptomyces olivaceus* NRRL 3583 bacterial cells was prepared in the manner described in Example 1. A portion of this beer was centrifuged and a 3 gram portion of wet whole bacterial cells was isolated. These cells were then suspended in 50 ml. of water and treated with 0.1 gm. of a 25 weight percent aqueous glutaraldehyde solution in the pH range of 6.5 to 8.5 at room temperature for 1 hour. The treated cells having an activity of 265 GIU/gram were collected by filtration and were used to convert glucose to fructose in the manner described in Example 1. The cells were recovered and reused with fresh glucose for a total of twelve times. The cells still retained 60.7 percent of the initial glucose isomerase activity.

EXAMPLE 3

A fermentation beer containing *Streptomyces olivaceus* NRRL 3583 bacterial cells was prepared in the manner described in Example 1. An aliquot portion of the whole beer containing 3 gm. of whole cells was mixed with 0.2 gm. of a 25 weight percent aqueous glutaraldehyde solution (1.67 weight percent glutaraldehyde based on dry weight of the cells) with stirring at room temperature and in the pH range of 6.5 to 8.5 for 1 hour. The treated cells having an activity of 271 GIU/gram were collected by filtration and were used to convert a glucose to fructose in the manner described in Example 1. The cells were recovered and reused with fresh glucose for a total of twelve times. The cells still retained 61.6 percent of the initial glucose isomerase activity.

EXAMPLE 4

A fermentation beer containing *Streptomyces olivaceus* NRRL 3583 bacterial cells was prepared in the manner described in Example 1. An aliquot portion of the whole beer containing 4 gm. of whole cells was mixed with 0.4 gm. of a 25 weight percent aqueous glutaraldehyde solution (2.5 weight percent glutaraldehyde based on dry weight of the cells) with stirring at room temperature for 1 hour. No pH control was employed. At the start of the reaction the cell mixture had a pH of 8.4. At the end of the reaction period, the pH was 6.8. The treated cells having an activity of 387 GIU/gram were collected by filtration and were used to convert glucose to fructose in the manner described in Example 1. The cells were recovered and reused with fresh glucose for a total of five times. The cells still retained 100 percent of the initial glucose isomerase activity.

EXAMPLE 5

A fermentation beer containing *Streptomyces olivaceus* NRRL 3583 bacterial cells was prepared in the manner described in Example 1 employing a 100 gal. fermentor. This beer had a total activity of 1,350,000 GIU and contained 7 lbs. of bacterial cells on a dry weight basis (425 GIU/gm.). The pH of the beer was adjusted to 8.2 by addition of sodium hydroxide. A 7 lb. portion of 50 weight percent aqueous glutaraldehyde solution diluted to a concentration of 0.5–0.6 percent (weight/volume basis) was added to the beer with agitation over a 30–40 min. period (50 weight percent glutaraldehyde based on dry weight of cells). The resulting mixture was then reacted at room temperature for 1.5 hr. with mild agitation. A 0.5 percent (weight/volume basis) portion of diatomaceous earth filter aid was then added and the beer was filtered on a rotary vacuum filter. The filter cake was washed with water to remove spent beer residues. The collected bacterial cells had a total activity of 1,215,000 GIU or 90 percent of the initial activity.

A glucose solution was prepared by mixing 225 lb. of glucose in 55 gal. of water (49.2 percent glucose on a weight/volume basis). To this solution were added cobalt chloride in an amount of 0.001 percent (weight/volume basis) and magnesium chloride in an amount of 0.01 percent (weight/volume basis). A portion of the above-prepared glutaraldehyde-treated bacterial cells having a total activity of 407,250 GIU was also added to the glucose solution. The resulting mixture was stirred at 60°C. for 24 hr. during which time the pH was maintained at 7.7–7.9 by addition of sodium hydroxide. The bacterial cells were filtered off from the reaction mixture which was then assayed to contain 40.2 percent fructose. The above-collected bacterial cells were then reused on a fresh glucose solution in the manner described above. This procedure was then repeated until the bacterial cells had been used a total of nine times. In the ninth run the glucose isomerase activity in the bacterial cells produced 38.8 percent fructose, which is still 96.5 percent of the initial performance.

What is claimed is:

1. A process for stabilization of glucose isomerase in whole bacterial cells which comprises treating whole bacterial cells having glucose isomerase activity at a pH from about 6.5 to about 8.5 with from about 0.1 to about 50 weight percent glutaraldehyde based on the dry weight of the cells.

2. A process according to claim 1 wherein the glutaraldehyde is employed in an amount from about 10 to about 50 weight percent based on the dry weight of the cells.

3. A process according to claim 1 wherein the bacterial cells are produced from *Streptomyces olivaceus*.

* * * * *